United States Patent [19]

Rosengrant

[11] Patent Number: 4,893,432
[45] Date of Patent: Jan. 16, 1990

[54] FISHING JIG

[76] Inventor: Walter H. Rosengrant, HC 68 Box 328A, Kingston, Okla. 73439

[21] Appl. No.: 322,400

[22] Filed: Mar. 13, 1989

[51] Int. Cl.⁴ .............................................. A01K 91/04
[52] U.S. Cl. .................................................. 43/42.74
[58] Field of Search .................. 43/42.74, 43.15, 44.84, 43/27.4, 43.1

[56] References Cited

U.S. PATENT DOCUMENTS

| | | | |
|---|---|---|---|
| 2,352,631 | 7/1944 | Guarnieri | 43/42.74 |
| 2,733,536 | 2/1956 | Terazono | 43/42.74 |
| 2,877,593 | 3/1959 | Baldridge | 43/42.74 |
| 3,550,305 | 12/1970 | Santosuosso | 43/42.74 |
| 3,646,700 | 3/1972 | Pond | 43/42.74 |
| 3,650,063 | 3/1972 | Pierce | 43/42.74 |
| 4,756,115 | 7/1988 | Reyen | 43/42.74 |

FOREIGN PATENT DOCUMENTS 14776 of 1895 United Kingdom ............... 43/43.15

Primary Examiner—Kurt Rowan
Attorney, Agent, or Firm—Robert K. Rhea

[57] ABSTRACT

A fishing jig is formed by a pair of wires disposed in crossed relation and centrally connected with a fishing line. Each of the wires have swivel and hook equipped leaders attached to its respective ends and medially the spacing between its ends and the wire crossed position. A central lure is attached at the wire crossed position. The lures and/or fish bait attached thereto simulate a school of shad or fish when the jig is trolled through water.

2 Claims, 2 Drawing Sheets

FISHING JIG

BACKGROUND OF THE INVENTION

1. Field of the invention.

The present invention relates to fishing tackle and more particularly to a fishing jig supporting a plurality of hook equipped lures.

2. Description of the prior art.

Fishing jigs supporting a plurality of hooks, such as trot lines, are well known. Other type of pole or rod fishing jigs, usually referred to as "crappie jigs", comprise an elongated wire-like support having two or more hook equipped leaders attached thereto.

This invention is distinctive over the crappie jig by forming a crossed rod support having a plurality of different length hook equipped leaders or lures depending from the wire-like support which simulates a school of shad or fish appearance when the jig is trolled from a boat, or the like.

SUMMARY OF THE INVENTION

A pair of elongated spring steel rods, crossed in 90° relationship, are joined at their juncture to form fishing line and central lure receiving loops. The respective end of each rod similarly describes a loop for receiving a like plurality of other hook equipped lures depending a predetermined distance from the respective rod and the central lure. Medially the spacing between its outermost end and crossed connection, each rod supports another hook equipped lure disposed at a predetermined position relative to the rod end lures and the central lure.

The principal object of this invention is to provide a fishing jig supporting a plurality of lures which simulate a school of shad or fish when trolled through the water.

DESCRIPTION OF THE PREFERRED EMBODIMENTS

Figure 1:
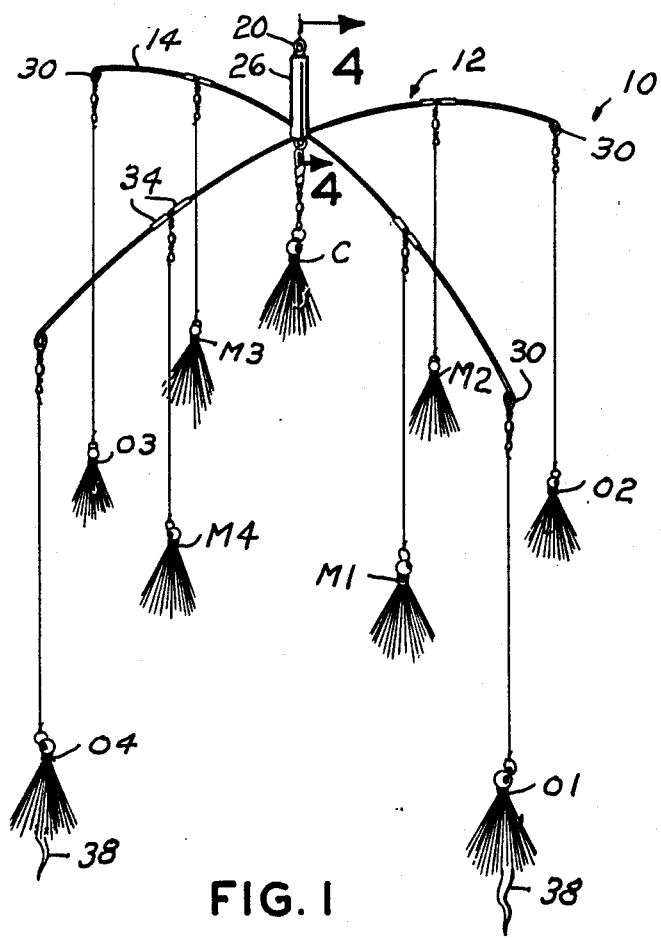
FIG. 1 is a perspective view of the device.
Figure 2:
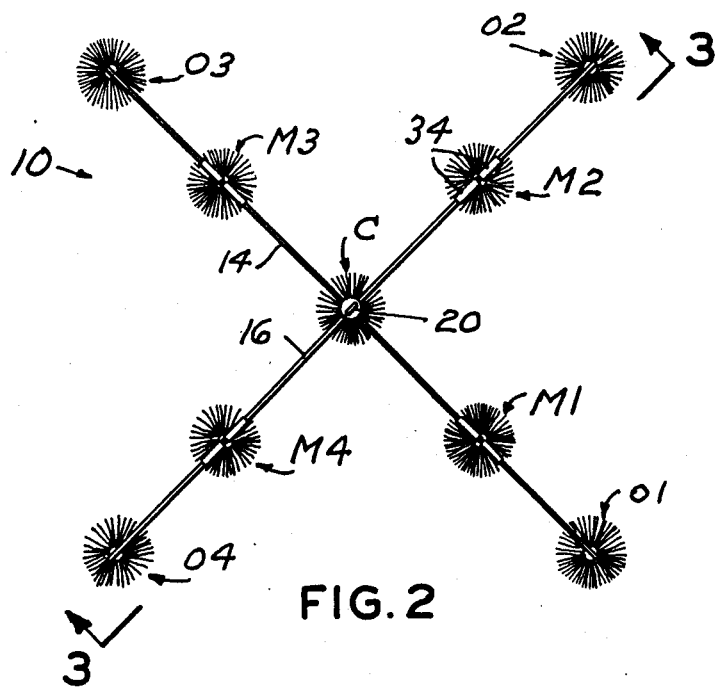
FIG. 2 is a top view of FIG. 1.

Like characters of reference designate like parts in those figures of the drawings in which they occur.

Figure 3:
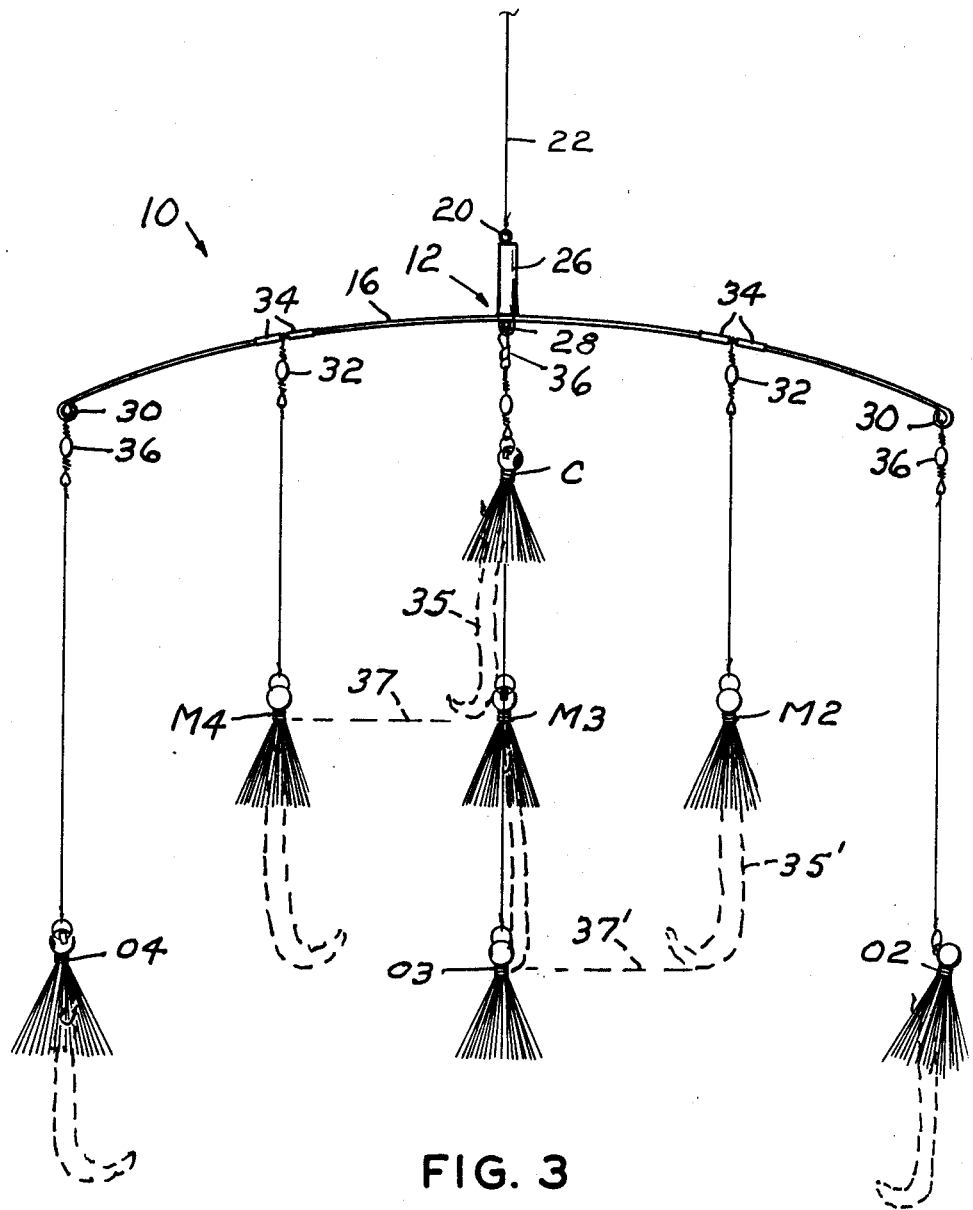
FIG. 3 is an elevational view looking in the direction of the arrows 3—3 of FIG. 2.
Figure 4:
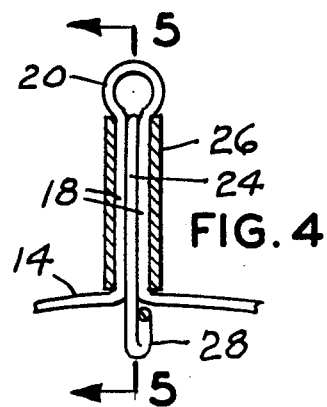
FIG. 4 is a fragmentary vertical cross sectional view taken substantially along the line 4—4 of FIG. 1; and,
FIG. 5 is a vertical cross sectional view taken substantially along the line 5—5 of FIG. 4.
Figure 5:
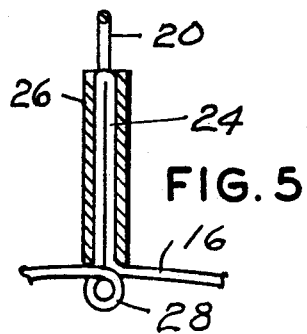

In the drawings:

The reference numeral 10 represents the jig, a whole, comprising a wire-like support 12 and a plurality of hook equipped leaders depending therefrom. The support 12 is preferably formed by stainless steel wires 14 and 16 with each wire being preferably arcuately bowed longitudinally with its ends disposed downwardly of its medial portion, as viewed in FIGS. 1 and 3. I have found a length of approximately 24" (61 cm) for each wire is satisfactory. The wires 14 and 16 are disposed in substantially 90° crossed relationship with the wire 14 having its medial portion doubled back upon itself, as at 18, projecting substantially normal to the remainder of the wire, as viewed in FIG. 3, and defining a loop 20 for receiving a fishing line 22. Medially its ends the other wire 16 is similarly doubled back upon itself, as at 24, and interposed between the doubled back portions 18 of the wire 14. These doubled back upon themselves wire portions 18 and 24 are surrounded by a split sleeve 26 and sealed together, as by sweat soldering, not shown, in a well known manner, thus forming a rigid connection of the wires 14 and 16. The wire 16 is additionally curved to form a loop 28 depending from the crossed position of the wires 14 and 16 for receiving a central hook equipped lure C.

The respective end portion of each wire is arcuately curved to form a closed loop 30 for respectively receiving one of a plurality (four) hook equipped leaders numbered 01, 02, 03 and 04. Substantially medially the respective wire end loop 30 and the crossed position of the wires, a plurality (four) additional hook equipped lures M1, M2, M3 and M4 are connected to the respective wire by one end loop of a swivel 32 surrounding the respective wire. These swivel loops being held against longitudinal sliding movement along the respective wire by sleeves 34 surrounding and secured to the respective wire on opposite sides of the swivel loop. The respective leaders of the lures 01–04 and the central lure C are similarly equipped with other swivels 36 for reasons well understood in the art.

The length of the leaders and the lures M1–M4 with respect to the central lure C is preferably such that the free end of a plastic bait worm 35, attached to the hook of the lure C, terminates in a horizontal plane, indicated by the broken line 37, intersecting the upper end portion of the lures M1–M4. Similarly, the outermost lures 01–04 and leaders are dimensioned so that the free end of other artificial bait worms 35' terminate in a horizontal plane 37' intersecting the upper end portion of the outer lures 01–04.

Operation

In operation, assuming the jig 10 is connected with a fishing line 22, fish bait, which may be live or artificial bait 38, is connected with the respective hook of each lure.

I have found that game fish are more inclined to take the bait on this jig by trolling the jig 10 from a boat, or the like. Assuming the results obtained is that the swivel lures or baits, when trolled through the water, simulates the appearance of shad or minnows which attract the target fish.

Obviously the invention is susceptible to changes or alterations without defeating its practicability. Therefore, I do not wish to be confined to the preferred embodiment shown in the drawings and described herein.

I claim:

1. A fishing jig, comprising:
a pair of elongated semirigid wires disposed in crossed relation medially their ends,
each wire of said pair of wires having its respective end portion arcuately curved to define a depending line receiving closed loop,
one wire of said pair of wires being doubled back upon itself at the crossed position to define a part circular upstanding loop and extend laterally a selected distance normal to its longitudinal axis,
the other wire of said pair of wires being arcuately curved to form a depending closed loop at the crossed position and similarly doubled back upon itself with its doubled back portion cooperatively received between the doubled back portions of said one wire;
a sleeve surrounding and bonded to the doubled back portions of said pair of wires; and, a first plurality of fishing lures respectively secured to said depending loops.

2. The fishing jig according to claim 1 and further including:

a second plurality of fishing lures depending from said pair of wires medially the spacing between the wire crossed position and the end loop of the respective wire of said pair of wires; and, sleeve means including a pair of sleeves surrounding and secured to each wire of said pair of wires on opposing sides of the respective lure of said second plurality of lures for preventing movement of said second plurality of lures longitudinally of the wires.

* * * * *